(12) United States Patent
Sekizawa et al.

(10) Patent No.: US 10,239,366 B2
(45) Date of Patent: Mar. 26, 2019

(54) WHEEL POSITION DETECTING DEVICE AND TIRE AIR PRESSURE DETECTING APPARATUS HAVING THE SAME

(71) Applicant: DENSO CORPORATION, Kariya, Aichi-pref. (JP)

(72) Inventors: Takatoshi Sekizawa, Kariya (JP); Masashi Mori, Kariya (JP); Nobuya Watabe, Kariya (JP)

(73) Assignee: DENSO CORPORATION, Kariya, Aichi-pref. (JP)

( * ) Notice: Subject to any disclaimer, the term of this patent is extended or adjusted under 35 U.S.C. 154(b) by 230 days.

(21) Appl. No.: 15/328,533

(22) PCT Filed: Jul. 24, 2015

(86) PCT No.: PCT/JP2015/003733
§ 371 (c)(1),
(2) Date: Jan. 24, 2017

(87) PCT Pub. No.: WO2016/017134
PCT Pub. Date: Feb. 4, 2016

(65) Prior Publication Data
US 2017/0210185 A1    Jul. 27, 2017

(30) Foreign Application Priority Data
Jul. 30, 2014    (JP) ................................. 2014-155340

(51) Int. Cl.
*B60C 23/04*   (2006.01)
*G08C 17/00*   (2006.01)
(Continued)

(52) U.S. Cl.
CPC ...... *B60C 23/0416* (2013.01); *B60C 23/0488* (2013.01); *B60C 23/0489* (2013.01);
(Continued)

(58) Field of Classification Search
CPC .. G01M 17/02; G01M 17/021; G01M 17/022; G01M 17/027; G01M 17/025;
(Continued)

(56) References Cited

U.S. PATENT DOCUMENTS

| 8,498,759 B1 * | 7/2013 | Juzswik | B60C 23/0416 |
| | | | 701/10 |
| 2014/0076040 A1 * | 3/2014 | Shima | B60C 23/0416 |
| | | | 73/146.5 |

(Continued)

FOREIGN PATENT DOCUMENTS

| JP | H10048233 A | 2/1998 |
| JP | 2013133058 A | 7/2013 |
| JP | 2014031144 A | 2/2014 |

*Primary Examiner* — Andre J Allen
(74) *Attorney, Agent, or Firm* — Harness, Dickey & Pierce, P.L.C.

(57) ABSTRACT

A wheel position detecting device can suppress an erroneous detection of a wheel position even if a moving direction of a vehicle cannot be determined by wheel speed sensors whether in a forward direction or in a rearward direction. When an edge number (or a tooth number) is incremented based on detection signals of the wheel speed sensors of one, two or three wheels while the vehicle is at a halt, the edge number (or the tooth number) is not used as learning data. Thus, it is less likely that the wheel position is erroneously detected based on erroneous learning data. Therefore, even if the moving direction of the vehicle cannot be determined whether in the forward direction or the rearward direction by the wheel speed sensors, the wheel position detecting device can suppress the erroneous wheel position detection.

5 Claims, 7 Drawing Sheets

(51) Int. Cl.
*G01D 5/16* (2006.01)
*B29D 30/00* (2006.01)

(52) U.S. Cl.
CPC ............... *G01D 5/16* (2013.01); *G08C 17/00* (2013.01); *B29D 2030/0072* (2013.01)

(58) Field of Classification Search
CPC ...... G01M 17/024; G01M 17/10; G01M 7/08; G01M 17/0076; G01M 17/013; G01M 17/03; G01M 17/04; G01M 17/06; G01M 17/08; G01M 1/02; G01M 1/045; G01M 1/12; G01M 1/225; G01M 3/04; G01M 3/40; G01M 5/0091; G01M 7/02; G01M 99/00; G01M 99/002; B60C 23/0494; B60C 23/04; B60C 23/0493; B60C 2019/004; B60C 19/00; B60C 23/0498; B60C 23/064; B60C 23/0488; B60C 23/0496; B60C 23/0408; B60C 23/041; B60C 23/0411; B60C 23/20; B60C 11/243; B60C 11/246; B60C 23/06; B60C 23/061; B60C 23/00; B60C 23/0486; B60C 11/0083; B60C 13/003; B60C 2009/2038; B60C 23/003; B60C 23/004; B60C 23/02; B60C 23/0401; B60C 23/0406; B60C 23/0416; B60C 23/0433; B60C 23/0455; B60C 23/0489; B60C 23/0491; B60C 25/002; B60C 25/005; B60C 25/007; B60C 29/02; B60C 3/04; B60C 99/00; B60C 99/006; B60C 11/24; B60C 13/001; B60C 13/02; B60C 15/0036; B60C 17/02; B60C 2009/0071; B60C 2009/2022; B60C 2200/02; B60C 2200/06; B60C 2200/065; B60C 23/001; B60C 23/007; B60C 23/008; B60C 23/0413; B60C 23/0427; B60C 23/0447; B60C 23/0454; B60C 23/0459; B60C 23/0467; B60C 23/0471; B60C 23/0472; B60C 23/0474; B60C 23/0476; B60C 23/0484; B60C 23/065; B60C 23/066; B60C 23/10; B60C 25/0548; B60C 25/056; B60C 25/132; B60C 25/138; B60C 25/18; B60C 29/005; B60C 9/005; B60C 9/18; B60C 9/1807; B60C 9/20; B60C 9/28
USPC .................................................. 73/146–146.8
See application file for complete search history.

(56) References Cited

U.S. PATENT DOCUMENTS

| | | | |
|---|---|---|---|
| 2014/0088816 A1* | 3/2014 | Shima | B60C 23/0416 701/29.1 |
| 2014/0167950 A1* | 6/2014 | Shima | B60C 23/0416 340/447 |
| 2014/0379291 A1 | 12/2014 | Mori et al. | |
| 2015/0191056 A1 | 7/2015 | Mori et al. | |
| 2017/0225526 A1* | 8/2017 | Tomakidi | B60C 23/0479 |

\* cited by examiner

1st RECEPTION

FIG. 5B

2nd RECEPTION

FIG. 5C

3rd RECEPTION

| RECEP | TIME (t) | TOOTH POSITION AT RECEPTION TIMING (0-95) | | | | WHEEL POSITION SPECIFYING LOGIC (TRUE or FALSE) | | | |
|---|---|---|---|---|---|---|---|---|---|
| | | FL | FR | RL | RR | FL | FR | RL | RR |
| RECEP 1 | 0.0 | 68 | 92 | 62 | 78 | — | — | — | — |
| RECEP 2 | 5.1 | 56 | 42 | 38 | 8 | TRUE | FALSE | TRUE | FALSE |
| RECEP 3 | 10.3 | 72 | 26 | 42 | 72 | TRUE | | TRUE | |
| RECEP 4 | 14.3 | 60 | 62 | 22 | 6 | TRUE | | FALSE | |

| RECEP | TIME (t) | TOOTH POSITION AT RECEPTION TIMING (0-95) | | | | WHEEL POSITION SPECIFYING LOGIC (TRUE or FALSE) | | | |
|---|---|---|---|---|---|---|---|---|---|
| | | FL | FR | RL | RR | FL | FR | RL | RR |
| RECEP 1 | 0.0 | 38 | 68 | 30 | 50 | — | — | — | — |
| RECEP 2 | 4.1 | 2 | 78 | 80 | 46 | FALSE | TRUE | FALSE | TRUE |
| RECEP 3 | 8.3 | 42 | 74 | 14 | 28 | | TRUE | | TRUE |
| RECEP 4 | 12.4 | 88 | 78 | 52 | 22 | | TRUE | | FALSE |

| RECEP | TIME (t) | TOOTH POSITION AT RECEPTION TIMING (0-95) | | | | WHEEL POSITION SPECIFYING LOGIC (TRUE or FALSE) | | | |
|---|---|---|---|---|---|---|---|---|---|
| | | FL | FR | RL | RR | FL | FR | RL | RR |
| RECEP 1 | 0.0 | 62 | 94 | 54 | 76 | — | — | — | — |
| RECEP 2 | 4.5 | 80 | 66 | 60 | 32 | TRUE | FALSE | TRUE | FALSE |
| RECEP 3 | 9.0 | 92 | 40 | 64 | 88 | FALSE | | TRUE | |

| RECEP | TIME (t) | TOOTH POSITION AT RECEPTION TIMING (0-95) | | | | WHEEL POSITION SPECIFYING LOGIC (TRUE or FALSE) | | | |
|---|---|---|---|---|---|---|---|---|---|
| | | FL | FR | RL | RR | FL | FR | RL | RR |
| RECEP 1 | 0.0 | 36 | 86 | 24 | 62 | — | — | — | — |
| RECEP 2 | 4.5 | 0 | 6 | 74 | 64 | FALSE | TRUE | FALSE | TRUE |
| RECEP 3 | 8.6 | 62 | 24 | 30 | 70 | | FALSE | | TRUE |

FIG. 7

WHEEL POSITION DETECTING DEVICE AND TIRE AIR PRESSURE DETECTING APPARATUS HAVING THE SAME

CROSS REFERENCE TO RELATED APPLICATIONS

This application is a U.S. National Phase Application under 35 U.S.C. 371 of International Application No. PCT/JP2015/003733 filed on Jul. 24, 2015 and published in Japanese as WO 2016/017134 A1 on Feb. 4, 2016. This application is based on and claims the benefit of priority from Japanese Patent Application No. 2014-155340 filed on Jul. 30, 2014. The entire disclosures of all of the above applications are incorporated herein by reference.

TECHNICAL FIELD

The present disclosure relates to a wheel position detecting device that automatically detects a position of a subject wheel in a vehicle, and a direct-type tire air pressure detecting apparatus having the wheel position detecting device.

BACKGROUND ART

As an example of the tire air pressure detecting apparatus, a direct-type tire air pressure detecting apparatus has been conventionally known. In the direct-type tire air pressure detecting apparatus, a transmitter is directly fixed to each of wheels with a tire. The transmitter is provided with a sensor, such as a pressure sensor. A vehicle body is equipped with an antenna and a receiver. When the transmitter transmits a detection signal of the sensor, the receiver receives the detection signal through the antenna, and the tire air pressure of the wheel is detected based on the detection signal.

In such a direct-type tire air pressure detecting apparatus, data transmitted from the transmitter includes individual ID information for identifying whether the transmitted data is associated with a subject vehicle to which the tire air pressure detecting apparatus is equipped, and for identifying the wheel to which the transmitter transmitting the data is fixed.

To specify the position of the transmitter based on the ID information of the transmitted data, the receiver needs to store beforehand a relationship between the ID information of each transmitter and the position of each wheel. When the positions of the wheels are changed by a tire rotation, it is necessary to register the relationship between the ID information of each transmitter and the position of each wheel again. For example, a patent literature 1 proposes a wheel position detecting device that is capable of automatically registering the relationship between the ID information of each transmitter and the position of each wheel.

The wheel position detecting device of the patent literature 1 performs wheel position detection to detect, using the detection signal of the wheel speed sensor, the position of the wheel to which the transmitter is equipped in the vehicle.

Specifically, a wheel speed sensor detects the number of teeth of a gear that pass besides the wheel speed sensor with rotation of the wheel, and gear information indicating a tooth position of the gear is obtained based on a detection signal of the wheel speed sensor. Next, a variation allowance range is set based on the tooth position at a reception timing of a frame. When the tooth position at the reception timing of the frame is not inside of the variation allowance range, the wheel corresponding to the gear is excluded from candidate wheels to which the transmitter that has transmitted the frame. Then, a remaining wheel is registered as the wheel to which the transmitter that has transmitted the frame. Moreover, an overlapping range between the variation allowance range based on the tooth position at the reception timing of the frame and the variation allowance range set based on the tooth position of the great at a previous reception timing of the frame is set as a new variation allowance range. In this way, a new variation allowance range is narrowed.

As described above, since the frame is transmitted when the transmitter is at a predetermined angular position of the tire, the tooth position at the reception timing of the frame is learned to perform the wheel position detection. Therefore, the wheel position can be further promptly and accurately detected.

PRIOR ART LITERATURE

Patent Literature

Patent Literature 1: JP 2013-133058 A

SUMMARY OF INVENTION

In a wheel position detection as in the patent literature 1 described above, a traveling time for several minutes is necessary depending on transmission frequency of a transmitter or a learning logic. Thus, the vehicle may encounter various situations, during the learning. For example, a vehicle will stop at a traffic signal, a passenger will get on or off the vehicle, or a passenger will load or unload luggage onto or from the vehicle. When a passenger gets on or off the vehicle, the vehicle body and the tires move due to the passenger's weight. Also, when a vehicle door is opened or closed, or when a passenger loads or unloads luggage onto or from the vehicle, the vehicle body and the tires move due to the change of the load. The movement of the vehicle body and the tires can be in a forward direction or a rearward direction of the vehicle. In this case, since the gears also move with the movement of the tires, the wheel speed sensors detect the movement of the tires.

There are two types of wheel speed sensors, one being a high-functioning type and the other being a low-functioning type. The high-functioning type wheel speed sensor can detect a moving direction of a vehicle by incrementing the count of the gear teeth when the vehicle moves forward, and by decrementing the count of the gear teeth when the vehicle moves backward. The low-functioning type wheel speed sensor increments the count of the gear teeth when the vehicle moves forward and when the vehicle moves rearward. That is, the low-functioning type wheel speed sensor cannot detect the moving direction of the vehicle. In a wheel position detecting device employing such low-functioning type wheel speed sensors, if a passenger gets on or off the vehicle or loads or unloads luggage onto or from the vehicle during the learning for the wheel position detection, it is not possible to confirm in which direction the tires have moved in a longitudinal direction of the vehicle based on the detection signals of the wheel speed sensors. Therefore, if the counted value of the gear teeth is incremented, the relationship between the reception timing of the frame and the counted value of the gear teeth is broken. As a result, the learning will not be performed accurately, and the wheel position will be erroneously detected.

In the explanation above, the situation where the passenger gets on or off the vehicle, and the situation where the passenger loads or unloads luggage onto or from the vehicle are used as examples causing the movement of the tires during the learning for the wheel position detection. As further example, the same issue will arise when the vehicle stops on a slope.

It is an object of the present disclosure to provide a wheel position detecting device that is capable of suppressing an erroneous detection of a wheel position even if a wheel speed sensor cannot specify whether a vehicle has moved forward or rearward, and to provide a tire air pressure detecting apparatus having the wheel position detecting device.

According to an aspect of the present disclosure, a transmitter includes an acceleration sensor that outputs a detection signal according to an acceleration containing a gravitational acceleration component varying with rotation of a wheel to which the transmitter is fixed. A first control unit detects an angle of the transmitter relative to a zero degree position based on the gravitational acceleration component provided by the detection signal of the acceleration sensor, in which the zero degree position is set at any position in a circumferential direction of the wheel to which the transmitter is integrated with respect to a center axis of the wheel as a center. Further, the first control unit repeatedly transmits a frame when the angle of the transmitter reaches a predetermined transmission angle.

A second control unit equipped to the receiver acquires an edge number or a tooth number of each of a plurality of gears based on a plurality of wheel speed sensors that detect passages of teeth of the gears. The gears are provided to rotate in association with the wheels. Each of the gears includes the teeth having conductivity and intermediate portions between the teeth. The teeth and the intermediate portions are alternately arranged so that the gear has outer surfaces having different magnetic resistances. The second control unit includes a wheel position learning section, a change detecting section and a resetting section. The wheel position learning section, when receiving the frame, repeatedly acquires the edge numbers or the tooth numbers at a reception timing of the frame, stores, as learning data, the edge numbers or the tooth numbers of the respective wheels at the reception timing of the frame for every identification information, and performs a wheel position detection based on the learning data stored. The change detecting section detects a change in the edge number or the tooth number of only a part of the wheels when the vehicle is at a halt. The resetting section resets the learning data when the change in the edge number or the tooth number is detected by the change detecting section.

In this way, when the vehicle is at a halt, if the edge number or the tooth number is incremented based on the detection signals of the wheel speed sensors of a part of the wheels, that is, of one, two or three wheels, the edge number or the tooth number is not used as the learning data. As such, it is less likely that the wheel position will be erroneously detected based on erroneous learning data. Accordingly, the wheel position detecting device can suppress erroneous detection of the wheel position, even if a moving direction of the vehicle cannot be determined whether forward or backward based on the wheel speed sensors.

BRIEF DESCRIPTION OF THE DRAWINGS

The above and other objects, features and advantages of the present disclosure will become more apparent from the following detailed description made with reference to the accompanying drawings. In the drawings.

DESCRIPTION OF EMBODIMENTS

Hereinafter, embodiments of the present disclosure will be described with reference to the drawings. Like or equivalent parts will be designated with like reference numerals throughout the embodiments described hereinafter.

First Embodiment

Figure 1:
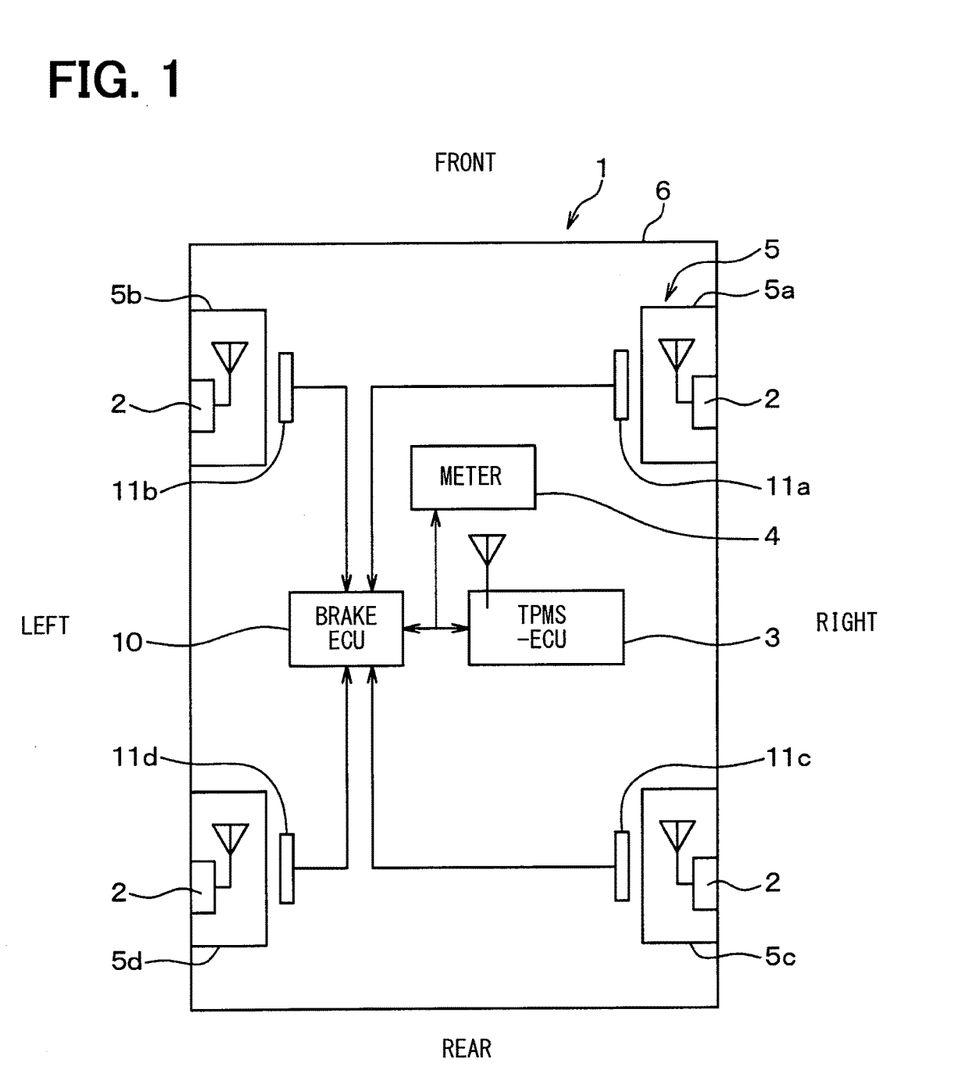
FIG. 1 is a schematic diagram for illustrating an overall structure of a tire air pressure detecting apparatus employing a wheel position detecting device according to a first embodiment of the present disclosure.

A first embodiment will be described with reference to the drawings. Firstly, an overall structure of a tire air pressure detecting apparatus employing a wheel position detecting device according to the first embodiment of the present disclosure will be described with reference to FIG. 1. In FIG. 1, an upward direction corresponds to a frontward direction of the vehicle 1, and a downward direction corresponds to a rearward direction of the vehicle 1.

As shown in FIG. 1, the tire air pressure detecting apparatus is equipped to the vehicle 1. The tire air pressure detecting apparatus includes transmitters 2, a tire air pressure detecting electronic control unit (hereinafter referred to as the TPMS-ECU (Tire Pressure Monitoring System-ECU) 3, and a meter 4. The TPMS-ECU 3 serves as a receiver. The wheel position detecting device uses the transmitters 2 and the TPMS-ECU 3, which are included in the tire air pressure detecting apparatus. The wheel position detecting device specifies a position of each wheel 5 (5a-5d) by acquiring gear information from a brake electronic control unit (hereinafter referred to as the brake ECU) 10. The gear information is provided based on a detection signal of each of wheel speed sensors 11a-11d, which are provided for the wheels 5a-5d, respectively.

As shown in FIG. 1, the transmitters 2 are correspondingly integrated to the wheels 5a-5d. The transmitter 2 detects a tire air pressure of the corresponding wheel 5a-5d. The transmitter 2 stores a result of detection of the tire air pressure, as information regarding a tire air pressure, in a frame, and transmits the frame. The TPMS-ECU 3 is integrated to a body 6 of the vehicle 1. The TPMS-ECU 3 receives the frame transmitted from the transmitter 2. Further, the TPMS-ECU 3 performs a wheel position detection and a tire air pressure detection by executing various processes and computations based on data stored in the frame. For example, the transmitter 2 generates the frame by a frequency shift keying (FSK). The TPMS-ECU 3 demodulates the frame to read data in the frame, and performs the wheel position detection and the tire air pressure detection based on the data read. Specific structures of the transmitters 2 and the TPMS-ECU 3 will be described with reference to FIG. 2A and FIG. 2B.

Figure 2A:
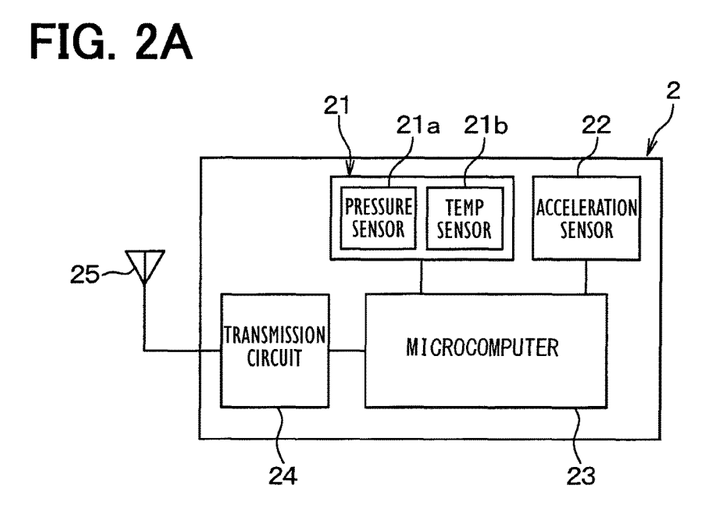
FIG. 2A is a schematic block diagram of a transmitter.

As shown in FIG. 2A, the transmitter 2 includes a sensing unit 21, an acceleration sensor 22, a microcomputer 23, a transmission circuit 24 and a transmitting antenna 25. The sensing unit 21, the acceleration sensor 22, the microcomputer 23, the transmission circuit 24 and the transmitting antenna 25 are driven by electric power supplied from a battery (not shown).

The sensing unit 21 includes a pressure sensor 21a and a temperature sensor 21b. The pressure sensor 21a is, for example, a diaphragm-type pressure sensor. The sensing unit 21 outputs a detection signal according to the tire air pressure, and a detection signal according to the temperature inside of the tire. The acceleration sensor 22 is used for detecting its position within the corresponding wheel 5a-5d to which the transmitter 2 is integrated. That is, the acceleration sensor 22 is used for detecting a position of the transmitter 2. Also, the acceleration sensor 22 is used for detecting a speed of the vehicle 1. The acceleration sensor 22 of the present embodiment outputs a detection signal according to accelerations in both radial directions of the corresponding wheel 5a-5d, that is, accelerations in both directions perpendicular to a circumferential direction of the corresponding wheel 5a-5d, for example, among accelerations exerting to the corresponding wheel 5a-5d during rotation of the corresponding wheel 5a-5d.

The microcomputer 23 is a well-known type microcomputer. The microcomputer 23 includes a control unit (first control unit) and the like. The microcomputer 23 performs a predetermined process in accordance with a program stored in a memory of the control unit. The memory of the control unit has individual ID information including transmitter identification information and vehicle identification information. The transmitter identification information is specific to the subject transmitter 2 for identifying the subject transmitter 2. The vehicle identification information is specific to the subject vehicle 1 to identify the subject vehicle 1.

The microcomputer 23 receives the detection signal indicating the tire air pressure from the sensing unit 21, and processes the detection signal to generate the information regarding the tire air pressure. Further, the microcomputer 23 stores the information regarding the tire air pressure as well as the ID information of the subject transmitter 2 in the frame. Also, the microcomputer 23 monitors the detection signal from the acceleration sensor 22. The microcomputer 23 detects the position of the subject transmitter 2 within the corresponding wheel 5a-5d to which the transmitter 2 is integrated, and detects the vehicle speed based on the detection signal from the acceleration sensor 22. When the microcomputer 23 generates the frame, the microcomputer 23 transmits the frame (data) toward the TPMS-ECU 3 through the transmission circuit 24 and the transmission antenna 25, based on detection results of the position of the subject transmitter 2 and the vehicle speed.

In particular, the microcomputer 23 begins to transmit the frame when the vehicle 1 is traveling. Further, the microcomputer 23 repeatedly transmits the frame when the transmitter 2 is at a predetermined angle, based on the detection signal of the acceleration sensor 22. The microcomputer 23 determines whether the vehicle 1 is traveling, based on the detection result of the vehicle speed. Also, the microcomputer 23 determines the angle of the acceleration sensor 22 based on the detection result of the position of the transmitter 2, which is obtained based on the detection signal of the acceleration sensor 22.

Namely, the microcomputer 23 detects the vehicle speed using the detection signal of the acceleration sensor 22, and determines that the vehicle 1 is traveling when the vehicle speed is equal to or greater than a predetermined speed (for example, 5 km/h). The output of the acceleration sensor 22 contains an acceleration (centrifugal acceleration) based on a centrifugal force. The vehicle speed is calculated by integrating the centrifugal accelerations and multiplying a coefficient. Therefore, the microcomputer 23 calculates the centrifugal acceleration by removing a gravitational acceleration component from the output of the acceleration sensor 22, and calculates the vehicle speed based on the calculated centrifugal acceleration.

The acceleration sensor 22 outputs the detection signal according to rotation of the corresponding wheel 5a-5d. Therefore, when the vehicle 1 is traveling, the detection signal of the acceleration sensor 22 contains the gravitational acceleration component. As such, the detection signal has an amplitude according to the rotation of the corresponding wheel. For example, the amplitude of the detection signal has a maximum negative value when the transmitter 2 is located right above a center axis of the corresponding wheel 5a-5d as the center, and has a maximum positive value when the transmitter 2 is located right under the center axis. Further, the amplitude of the detection signal has a value of zero when the transmitter 2 is at the same level as the center axis. Therefore, the position of the acceleration sensor 22, that is, the angular position of the acceleration sensor 22 can be detected based on the amplitude. For example, a position where the transmitter 2 is right above the center axis of the corresponding wheel 5a-5d as the center is defined as a zero degree position. The angle of the acceleration sensor 22 is defined relative to the zero degree position.

The transmitter 2 begins to transmit the frame when the vehicle speed reaches a predetermined speed or when the acceleration sensor 22 is at the predetermined angle after the vehicle speed reaches the predetermined speed. Further, the transmitter 2 repeatedly transmits the frame when the acceleration sensor 22 reaches the position same as the position where the frame is transmitted first time, as a transmission timing. With regard to the transmission timing, the frame may be transmitted every time the acceleration sensor 22 reaches the predetermined angle same as the angle when the frame is transmitted first time. However, it is preferable to transmit the frame only once in a predetermined time period (for example, for 15 seconds) in consideration with a battery life, in place of always transmitting the frame every time the angle of the transmitter 2 reaches the predetermined angle.

The transmission circuit 24 serves as an output unit that receives the frame provided from the microcomputer 23 and transmits the frame toward the TPMS-ECU 3 through the transmission antenna 25. For example, the frame is transmitted through an RF band radio wave.

The transmitter 2 configured as described above is, for example, fixed to an air injection valve of the corresponding wheel 5a-5d such that the sensing unit 21 exposes inside of the tire. The pressure sensor 21a of the transmitter 2 detects the tire air pressure. As described above, when the vehicle speed exceeds the predetermined speed, the transmitter 2 repeatedly transmits the frame through the transmission antenna 25 when the transmitter 2 reaches the predetermined angle. It may be possible that the transmitter 2 thereafter keeps to transmit the frame when the acceleration sensor 22 is at the predetermined position. However, considering the battery life, it is preferable to increase a transmission interval. Therefore, it is preferable to switch the transmitter 2 from a wheel position specifying mode to a regular transmission mode when a predetermined time period necessary for specifying the wheel position has elapsed. In the regular transmission mode, the transmitter 2 regularly transmits the frame toward the TPMS-ECU 3 at a constant interval (for example, every one minute), which is longer than the transmission interval in the wheel position specifying mode. In this case, for example, it may be possible to differentiate the transmission timing of the frame between the transmitters 2 by setting a random delay for each transmitter 2. In such a case, interference of the radio waves from the plural transmitters 2 will be reduced, so that the frames will be properly received by the TPMS-ECU 3.

Figure 2B:
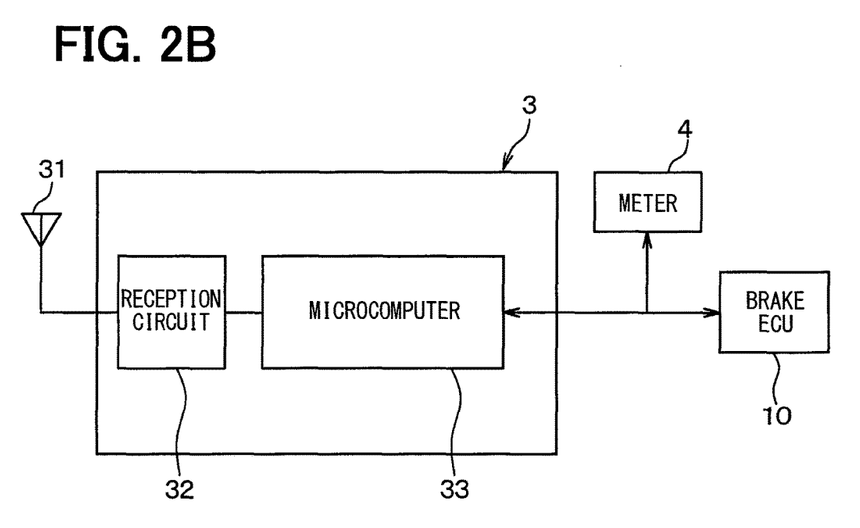
FIG. 2B is a schematic block diagram of a TPMS-ECU.

As shown in FIG. 2B, the TPMS-ECU 3 includes a reception antenna 31, a reception circuit 32, and a microcomputer 33. The TPMS-ECU 3 acquires the gear information from the brake ECU 10 through an in-vehicle local area network (LAN), such as a controller area network (CAN), to obtain a tooth position of each gear, which is represented by an edge number (or a tooth number). Each gear rotates with the corresponding wheel 5a-5d.

The reception antenna 31 is provided to receive the frame transmitted from each transmitter 2. The reception antenna 31 is fixed to the vehicle body 6. The reception antenna 31 may be an internal antenna disposed inside of a body of the TPMS-ECU 3. Alternatively, the reception antenna 31 may be an external antenna disposed outside of the body of the TPMS-ECU 3 and connected to the body of the TPMS-ECU 3 through a wire extended from the body.

The reception circuit 32 serves as an input section that receives the frame transmitted from each transmitter 2 through the reception antenna 31, and sends the frame to the microcomputer 33. When the reception circuit 32 receives a signal (frame) through the reception antenna 31, the reception circuit 32 transmits the received signal to the microcomputer 33.

The microcomputer 33 corresponds to a second control unit. The microcomputer 33 performs a wheel position detection processing in accordance with a program stored in a memory of the microcomputer 33. In particular, the microcomputer 33 performs the wheel position detection based on a relationship between vehicle speed information and gear information acquired from the brake ECU 10 and a reception timing receiving the frame transmitted from each transmitter 2. The microcomputer 33 acquires the gear information of each of the wheel speed sensors 11a-11d provided correspondingly for the wheels 5a-5d from the brake ECU 10 in every predetermined cycle (for example, every 10 milliseconds) and performs computation of the vehicle speed, or the like.

The gear information indicates the tooth position of each gear rotating with the corresponding wheel 5a-5d. For example, each of the wheel speed sensors 11a-11d is provided by an electromagnetic pick-up sensor disposed to oppose teeth of the corresponding gear. A detection signal outputted from the wheel speed sensor 11a-11d changes in accordance with passage of the teeth of the gear. This type of the wheel speed sensor 11a-11d outputs a rectangular pulse wave corresponding to passage of the teeth, as the detection signal. Rising edges and falling edges of the rectangular pulse wave indicate the passage of edges of the teeth of the gear. Therefore, the brake ECU 10 increments the edge number, that is, counts the number of edges being passed through the wheel speed sensor 11a-11d based on the number of rising edges and falling edges of the detection signal of the wheel speed sensor 11a-11d. The brake ECU 10 provides a current edge number (incremented count) to the microcomputer 33 in every predetermined cycle, as the gear information indicating the tooth position. Therefore, the microcomputer 33 can determine which tooth of the gear currently passes through the wheel speed sensor 11a-11d.

The edge number is reset each time the gear rotates 360 degrees. For example, in a case of gear having 48 teeth, the number of edges is 96. In this case, the edge number is counted from 0 to 95. When the edge number counted reaches 95, the edge number returns to 0, and is counted again from zero.

In the example described above, the edge number is provided from the brake ECU 10 to the microcomputer 33 as the gear information. As another example, a tooth number, that is, the number of teeth counted may be provided from the brake ECU 10 to the microcomputer 33 as the gear information. As further another example, the number of edges or the number of teeth, which have passed through the wheel speed sensor in a predetermined period, may be provided to the microcomputer 33, and the microcomputer 33 may add the number of edges or the number of teeth provided to a previous edge number or tooth number, to detect the edge number or the tooth number. That is, a way of detecting the edge number or the tooth number may not be limited to a specific way as long as the microcomputer 33 ultimately obtains the edge number or the tooth number as the gear information. The brake ECU 10 resets the edge number (or the tooth number) when the power supply is turned off. The brake ECU 10 begins to count the edge number (or the tooth number) again when the power supply is turned on or when the vehicle speed reaches the predetermined speed after the power supply is turned on. In this way, even if the edge number (or the tooth number) is reset every time the power supply is turned off, the same tooth is indicated with the same edge number (or the same tooth number) during the electric power being off.

When the microcomputer 33 receives the frame transmitted from each transmitter 2, the microcomputer 33 measures the reception timing of the frame, and performs the wheel position detection based on the edge number (or the tooth number) at the reception timing of the frame among the edge numbers (or the tooth numbers) that have acquired. Therefore, the wheel position detection to specify which of the wheels 5a-5d each transmitter 2 is integrated to can be performed. The wheel position detection will be described later more in detail.

The microcomputer 33 stores a relationship between the ID information of each transmitter 2 and the position of each wheel 5a-5d to which the transmitter 2 is integrated, based on the result of the wheel position detection. Thereafter, the microcomputer 33 detects the tire air pressure of each wheel 5a-5d based on the ID information and the information on the tire air pressure, which are stored in the frame transmitted from each transmitter 2. Further, the microcomputer 33 outputs an electric signal according to the tire air pressure to the meter 4 through the in-vehicle LAN, such as the CAN. For example, the microcomputer 33 detects a decrease in air pressure of the tire by comparing the detected tire air pressure to a predetermined threshold. When the microcomputer 33 detects the decrease in the tire air pressure, the microcomputer 33 outputs a signal indicating the decrease in the tire air pressure to the meter 4. Namely, the microcomputer 33 can notify the meter 4 of the decrease of the tire air pressure of any of the wheels 5a-5d.

The meter 4 serves as a warning section. As shown in FIG. 1, the meter 4 is disposed at a position which can be seen by a driver. For example, the meter 4 is provided by a meter display and the like disposed within an instrument panel of the vehicle 1. For example, when the meter 4 receives the signal indicating the decrease in tire air pressure from the microcomputer 33 of the TPMS-ECU 3, the meter 4 displays the decrease in the tire air pressure with the indication of the wheel 5a-5d. Namely, the meter 4 notifies the driver of the decrease in the tire air pressure of a certain wheel 5a-5d.

Next, an operation of the tire air pressure detecting apparatus of the present embodiment will be described. In the following description of the operation of the tire air pressure detecting apparatus, the wheel position detection and the tire air pressure detection, which are performed by the tire air pressure detecting apparatus, will be explained separately.

First, the wheel position detection will be described. The method of the wheel position detection will be described in detail with reference to FIGS. 3 to 6D.

In the transmitter 2, the microcomputer 23 monitors the detection signal of the acceleration sensor 22 in every predetermined sampling cycle, based on electric power supply from the battery, to detect the vehicle speed and the angle of the acceleration sensor 22 within the corresponding wheel 5a-5d. After the vehicle speed reaches a predetermined speed, the microcomputer 23 repeatedly transmits the frame at a time point where the angle of the acceleration sensor 22 reaches a predetermined angle. For example, each of the transmitters 2 beings to transmit the frame when the vehicle speed reaches the predetermined speed as a timing where the transmitter 2 reaches the predetermined angle, or when the acceleration sensor 22 reaches a predetermined angle after the vehicle speed reaches the predetermined speed. Thereafter, the transmitter 2 repeatedly transmits the frame at the timing where the acceleration sensor 22 is at the angle same as the angle when the frame is transmitted first time, as a transmission timing.

Figure 3:
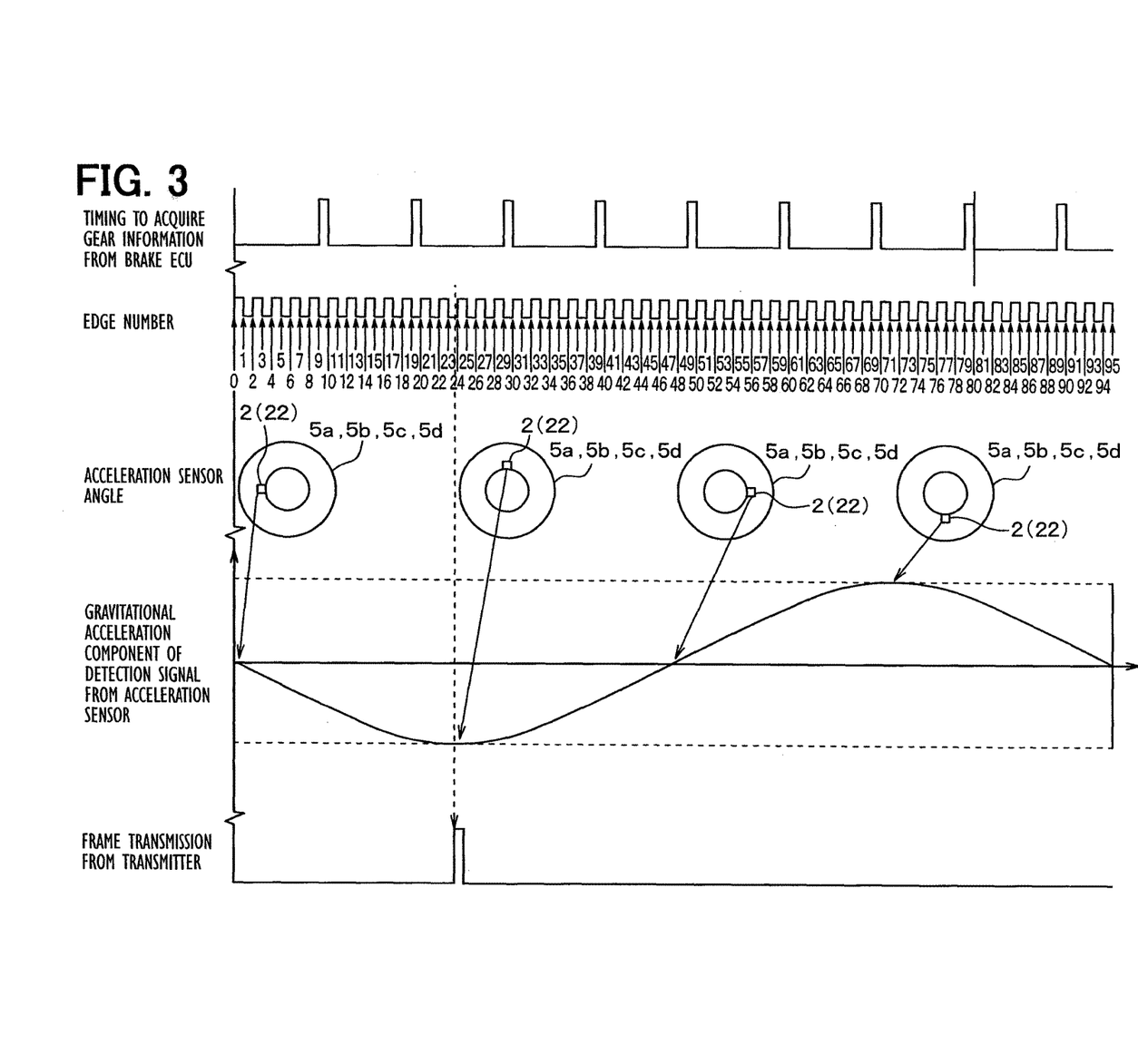
FIG. 3 is a time chart for explaining a wheel position detection.

That is, the gravitational acceleration component of the detection signal outputted from the acceleration sensor 22 has a sine curve, as shown in FIG. 3. The angle of the acceleration sensor 22 is detected based on the sine curve. Therefore, the frame is transmitted each time the acceleration sensor 22 reaches the same angle based on the sine curve.

The TPMS-ECU 3 acquires the gear information of the wheel speed sensor 11a-11d provided in association with the corresponding wheel 5a-5d, in every predetermined cycle (for example, for every 10 milliseconds) from the brake ECU 10. The TPMS-ECU 3 measures the reception timing of the frame transmitted from each transmitter 2, and detects the edge number (or the tooth number) of the gear at the reception timing of the frame among the edge numbers (or the tooth numbers) acquired.

In this case, it is not always true that the reception timing of the frame transmitted from each transmitter 2 and the cycle of acquiring the gear information from the brake ECU 10 coincide with each other. Therefore, among the cycles in which the gear information have been acquired from the brake ECU 10, the edge number (or the tooth number) of the gear information acquired in the cycle that is the closest to the reception timing of the frame may be used as the edge number (or the tooth number) at the reception timing of the frame. In this case, the cycle being closest to the reception timing of the frame may be the period immediately before or immediately after the reception timing of the frame. As another example, the edge number (or the tooth number) at the reception timing of the frame may be calculated using the edge number (or the tooth number) indicated by the gear information acquired in the period immediately before or immediately after the reception timing of the frame. For example, an intermediate number between the edge number (or the tooth number) of the gear information acquired in the period immediately before the reception timing of the frame and the edge number (or the tooth number) of the gear information acquired in the period immediately after the reception timing of the frame may be used as the edge number (or the tooth number) of the reception timing of the frame.

The TPMS-ECU 3 obtains the edge number (or the tooth number) at the reception timing of the frame each time the TPMS-ECU 3 receives the frame. The TPMS-ECU 3 performs the wheel position detection based on the obtained edge numbers (or tooth numbers), at the reception timing of the frame. In particular, the wheel position detection is performed by determining whether variation of the obtained edge number (or tooth number) at the reception timing of the frame is within a predetermined range that is set based on the edge number (or the tooth number) at the previous reception timing.

In regard to a wheel to which a subject transmitter 2 transmitting the frame is integrated, the subject transmitter 2 transmits the frame at a timing where the angle of the subject transmitter 2 reaches the predetermined angle. Therefore, the tooth position of the gear corresponding to the wheel, which is indicated by the edge number (or the tooth number) at the reception timing of the frame is substantially the same as the tooth position at the previous reception timing. As such, the variation of the edge numbers (or the tooth numbers) at the reception timings of the frame is small, and is within a predetermined range. Even if the frames are received at many times, the tooth positions at the reception timings of the frame are substantially the same, that is, within a predetermined range. The variation of the edge number (or the tooth number) at each reception timing of the frame is within a predetermined range set based on the edge number (or the tooth number) at the first reception timing of the frame. On the other hand, in regard to a wheel different from the wheel from which the frame is transmitted, the tooth position at the reception timing of the frame transmitted from the subject transmitter 2 is different from the tooth position indicated by the edge number (or the tooth number) at the reception timing of the frame transmitted from the subject transmitter 2.

Namely, the gear of the wheel speed sensor 11a-11d rotates in association with the corresponding wheel 5a-5d. Therefore, with regard to the wheel 5a-5d from which the frame is transmitted, the tooth position at the reception timing of the frame transmitted from the subject transmitter 2 is substantially equal. In fact, the wheels 5a-5d have different rotating states due to a road condition, a turning of a vehicle, a lane changing of a vehicle and the like. Therefore, the rotating states of the wheels 5a-5d are not exactly the same. As such, the tooth position indicated by the edge number (or the tooth number) at the reception timing is different between the wheels 5a-5d.

Figure 4:
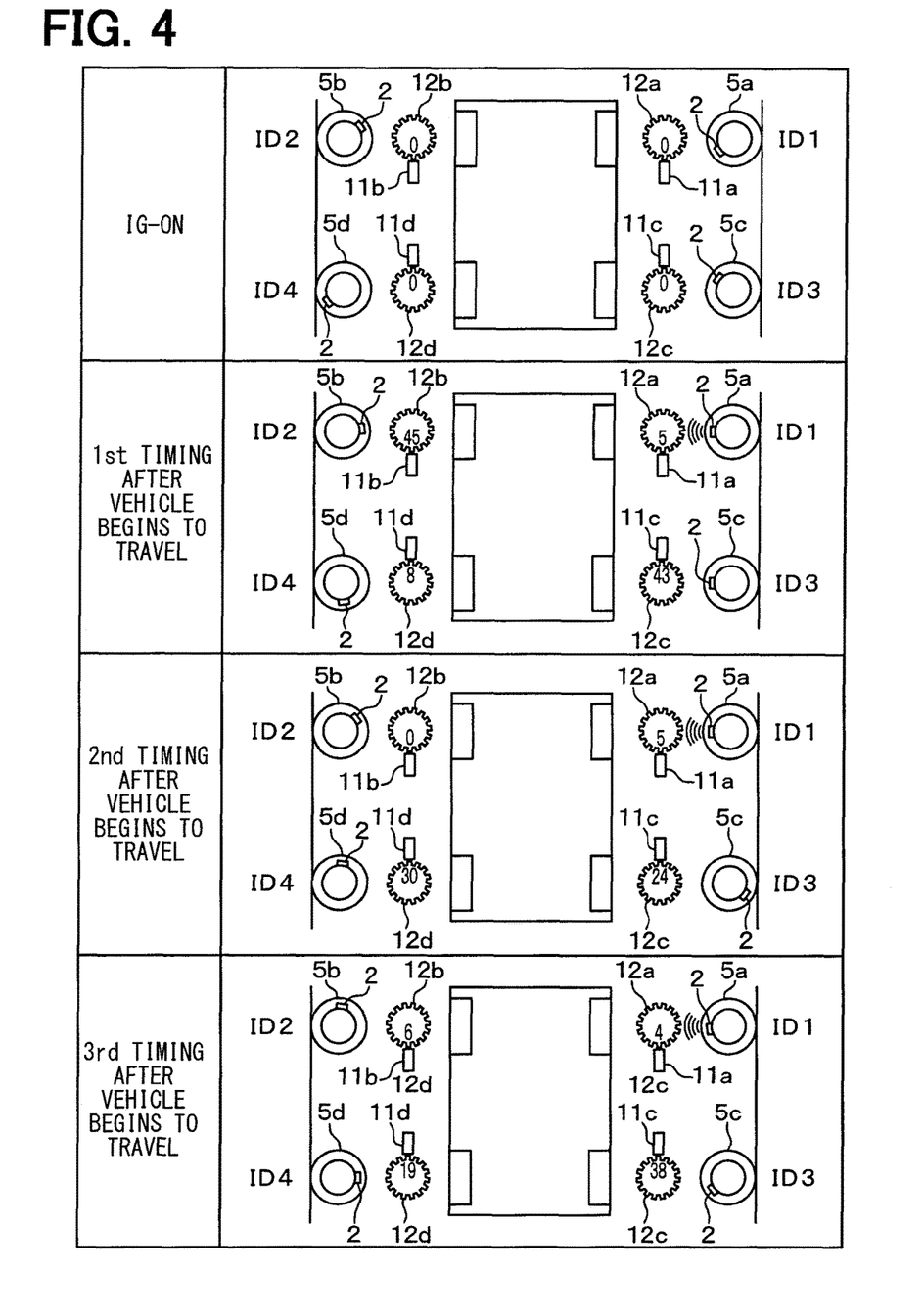
FIG. 4 is a schematic diagram for illustrating a change of gear information.

As shown in FIG. 4, the edge number of each of gears 12a-12d is zero when the ignition switch (IG) is turned on. The wheel that is different from the wheel that has subsequently transmits the frame after the vehicle begins to travel from the state where the edge number of each gears 12a-12d is zero has variation in the tooth position indicated by the edge number (or tooth number) of the gear at the reception timing of the frame. The wheel position detection is performed by determining whether the variation is within a predetermined range or not.

Figure 5A:
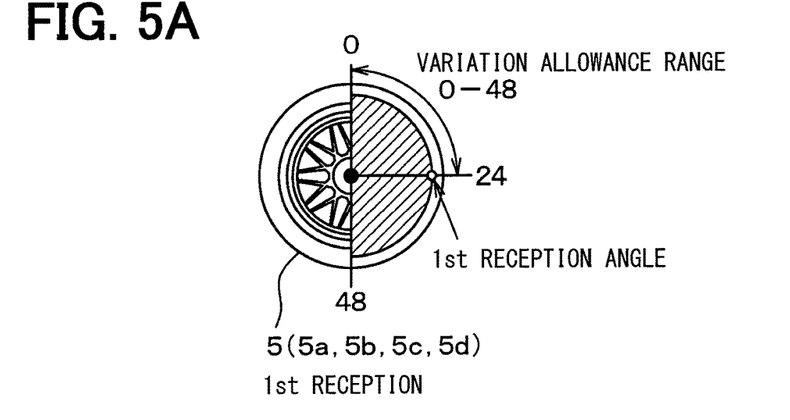
FIG. 5A is a schematic diagram for illustrating a wheel position specifying logic.
Figure 5B:
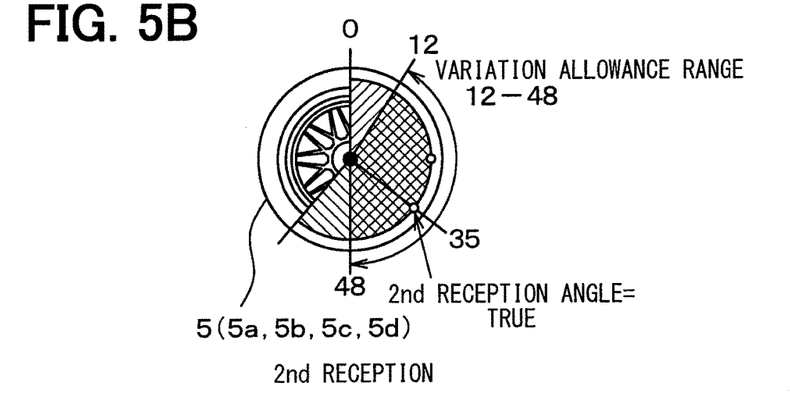
FIG. 5B is a schematic diagram for illustrating the wheel position specifying logic.

For example, as shown in FIG. 5A, it is assumed that the position of the subject transmitter 2 when the subject transmitter 2 transmits the frame first time is at a first reception angle. In this case, a variation allowance range, which is an allowable range of the variation of the edge number (or the tooth number), is set at a range of 180° centering on the first reception angle, that is, at a range of +/−90° of the first reception angle. In regard to the edge number, the variation allowance range is set at a range of +/−24 of the edge number at the first reception timing. In regard to the tooth number, the variation allowance range is set at a range of +/−12 of the tooth number at the first reception timing. In this case, as shown in FIG. 5B, if the edge number (or the tooth number) of the gear is within a first variation allowance range that is determined by the first reception timing, there is a possibility that the wheel corresponding this gear is the wheel to which the subject transmitter 2 transmitting the frame is integrated. Thus, this determination result is indicated as "TRUE".

Further, the variation allowance range is further set centering on a second reception position that is the angle of the transmitter when the frame is received second time. The variation allowance range has a value corresponding to 180° (±90°) centering on the second reception angle. Therefore, an overlapping range between the variation allowance range of 180° (±90°) centering on the first reception angle as a previous variation allowance range and the variation allowance range of 180° (±90°) centering on the second reception angle is set as a new variation allowance range (the range of edge number is 12 to 48). Thus, the new variation allowance range can be narrowed to the overlapping range.

Figure 5C:
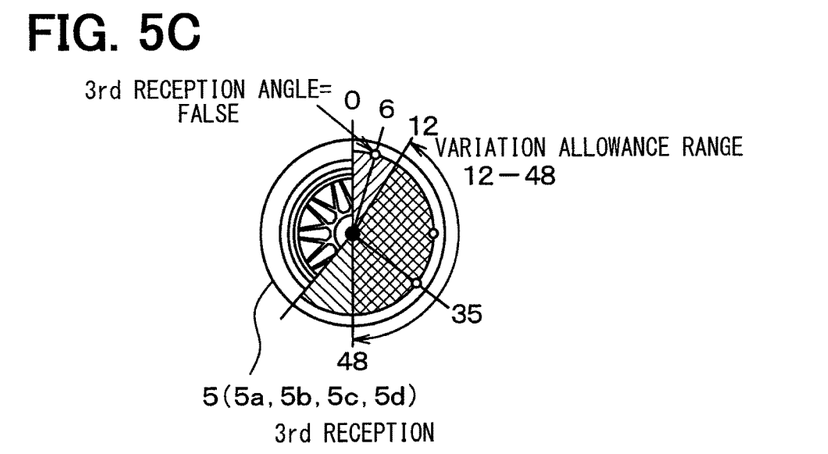
FIG. 5C is a schematic diagram for illustrating the wheel position specifying logic.

As shown in FIG. 5C, therefore, if the edge number (or the tooth number) of the gear at the third reception timing of the frame is not within the variation allowance range that is set by the variation allowance ranges of the first and second reception timings of the frames, the wheel corresponding this gear is not the wheel to which the subject transmitter 2 transmitting the frame is integrated. Thus, this determination result is indicated as "FALSE". In this case, when the edge number (or the tooth number) at the third reception timing of the frame is outside of the variation allowance range that is set by the variation allowance ranges of the first and second reception timings of the frames, even within the variation allowance range set by the first reception timing of the frame, the determination result is indicated as "FALSE". In this way, the microcomputer 33 can specify to which wheel 5a-5d the subject transmitter 2 transmitting the frame is integrated.

Figure 6A:
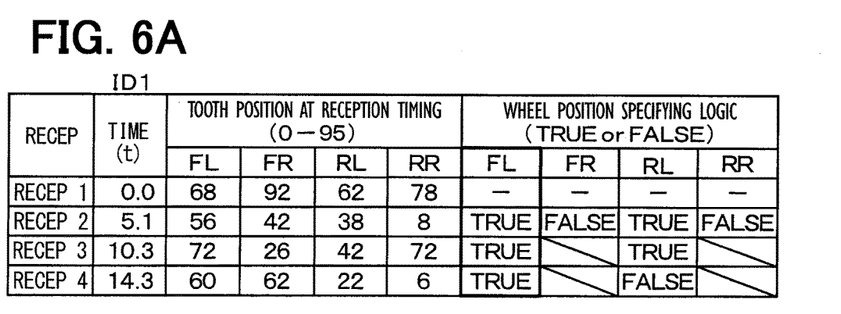
FIG. 6A is a diagram illustrating a wheel position evaluation result.

As shown in FIG. 6A, each time the fame including ID1 as the identification information is received, the microcomputer 33 detects the edge numbers (or the tooth numbers) of the gears 12a-12d. The microcomputer 33 stores the edge numbers (or the tooth numbers) for respective wheels 5a-5d (a front left wheel FL, a front right wheel FR, a rear left wheel RL and a rear right wheel RR). Further, each time the frame is received, the microcomputer 33 determines whether each of the detected edge numbers (or the tooth numbers) is within the variation allowance range. When the edge number is not within the variation allowance range, the microcomputer 33 excludes the corresponding wheel from candidate wheels to which the subject transmitter 2 is integrated until one wheel remains. The microcomputer 33 registers the wheel remaining the last as the wheel to which the subject transmitter 2 transmitting the frame is integrated. In the case of the frame including the identification information ID1, the front right wheel FR and the rear right wheel RR are excluded first, and the rear left wheel RL is next excluded. Thus, the front left wheel FL, which remains the last, is registered as the wheel to which the subject transmitter 2 is integrated. Through this learning, the position of the wheel to which the transmitter 2 transmitting the frame including the identification information ID1 is detected.

Figure 6B:
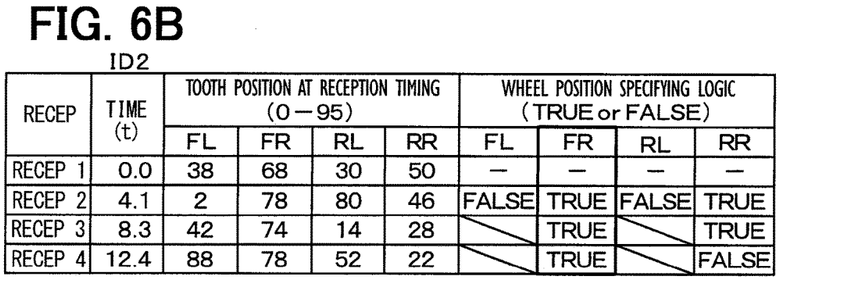
FIG. 6B is a diagram illustrating a wheel position evaluation result.
Figure 6C:
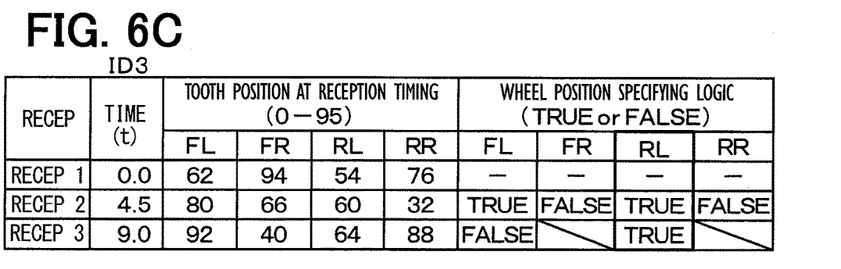
FIG. 6C is a diagram illustrating a wheel position evaluation result.
Figure 6D:
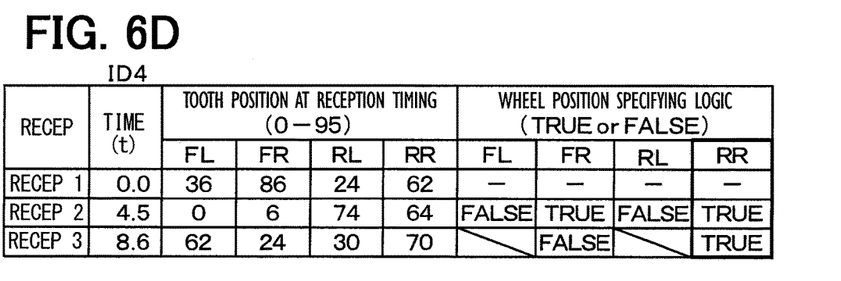
FIG. 6D is a diagram illustrating a wheel position evaluation result.

The microcomputer 33 performs the similar learning to the frames including the identification information ID2, ID3, ID4, as shown in FIGS. 6B to 6D. In this way, the wheels to which the transmitters 2 transmitting the frames including ID2 to ID4 are integrated are respectively specified. As such, all four wheels having the transmitters 2 can be specified.

In this way, it is specified from which wheel 5a-5d the frame is transmitted. The microcomputer 33 stores the relationship between the ID information of each transmitter 2 transmitting the frame and the position of the corresponding wheel to which the transmitter 2 is fixed. Accordingly, the wheel position detection is performed.

The TPMS-ECU 3 receives the frame that is transmitted when the vehicle speed reaches the predetermined speed, and stores the gear information at the reception timing of the frame transmitted when the vehicle speed reaches the predetermined speed. Also, the TPMS-ECU 3 cancels the gear information stored when the vehicle speed is equal to or less than a predetermined vehicle stop determination speed (for example, 3 km/h). When the vehicle begins to travel again, the TPMS-ECU 3 newly performs the wheel position detection in the manner described above.

After the wheel position detection is performed in the manner described above, the tire pressure detection is performed. Specifically, when the tire pressure detection is performed, the frame is transmitted from each of the transmitters 2 in every predetermined cycle. The TPMS-ECU 3 receives the frames from all four wheels each time the transmitters 2 transmit the frames. The TPMS-ECU 3 determines from which transmitter 2 each of the frames is transmitted based on the ID information stored in the frame, and detects the tire air pressure of each of the wheels 5a-5d from the information regarding the tire pressure stored in the frame. Thus, the TPMS-ECU 3 can detects the decrease in tire air pressure of each of the wheels 5a-5d, and can specify the wheel 5a-5d having the tire whose air pressure is decreased. When the TPMS-ECU 3 detects the decrease in tire air pressure of any of the wheels 5a-5d, the TPMS-ECU 3 notifies the meter 4 of the detection result. Thus, the meter 4 displays the decrease in the tire air pressure with the indication of the subject wheel 5a-5d to notify the driver.

As described above, the gear information indicating the tooth position of each gear 12a-12d is obtained based on the detection signal of the wheel speed sensors 11a-11d that detects the passage of the teeth of the gear 12a-12d rotated with the corresponding wheel 5a-5d. The variation allowance range is set based on the tooth position at the reception timing of the frame. When the tooth position at a subsequent reception timing of the frame is not within the set variation allowance range, the corresponding wheel 5a-5d is excluded from the candidate wheels to which the subject transmitter 2 transmitting the frame is fixed. The wheel 5a-5d remaining the last is registered as the wheel to which the subject transmitter 2 is fixed. Therefore, the wheel position can be specified with a small amount of data.

Further, the variation allowance range is renewed to an overlapping range where the variation allowance range set based on the tooth position at the reception timing of the frame and the variation allowance range set based on the tooth position at the subsequent reception timing of the frame overlap with each other. In this way, the new variation allowance range is reduced to the overlapping range. Therefore, the wheel position is specified properly in a shorter time.

As described above, however, the edge number (or the tooth number) is counted by incrementing the edge number of the gear based on the number of the rising edges and the number of the falling edges of the detection signal of the wheel speed sensor 11a-11d. In a case where the moving direction of the vehicle can be detected based on the detection signal of the wheel speed sensor 11a-11d, the edge number (or the tooth number) can be obtained accurately by incrementing the counted value when the moving direction is the forward direction, and by decrementing the counted value when the moving direction is the rearward direction. However, in a case where the moving direction of the vehicle cannot be detected based on the detection signal of the wheel speed sensor 11a-11d, and when tires are moved when a passenger gets on or off the vehicle, or loads or unloads luggage onto or from the vehicle, the relationship between the reception timing of the frame and the counted value of the edge number (or the tooth number) breaks. As a result, the learning will not be accurately performed, and the wheel position will be erroneously detected.

In the present embodiment, therefore, it is performed a processing to refrain from using the edge number (or the tooth number) as learning data when the edge number (or the tooth number) of the gear of one, two, or three wheels is incremented based on the detection signals of the wheel speed sensors 11a-11d while the vehicle is at a halt. That is, when the edge number (or the tooth number) is incremented during the stopping of the vehicle, it is assumed that the tires are moved due to the passenger getting on or off the vehicle or loading or unloading luggage onto or from the vehicle. Therefore, the edge number (or the tooth number) in this time is not used as the learning data. In this case, a case where the edge numbers (or the tooth numbers) based on the detection signals of all the wheel speed sensors 11a-11d are incremented is excluded because there is a high possibility that the vehicle has begun to travel normally. When the passenger gets on or off the vehicle or loads or unloads luggage onto or from the vehicle around a driver's seat or a passenger seat, the nearby tire moves, but the remaining tires less move. Therefore, it is determined that the vehicle begins to travel when all four wheels are moved.

Figure 7:
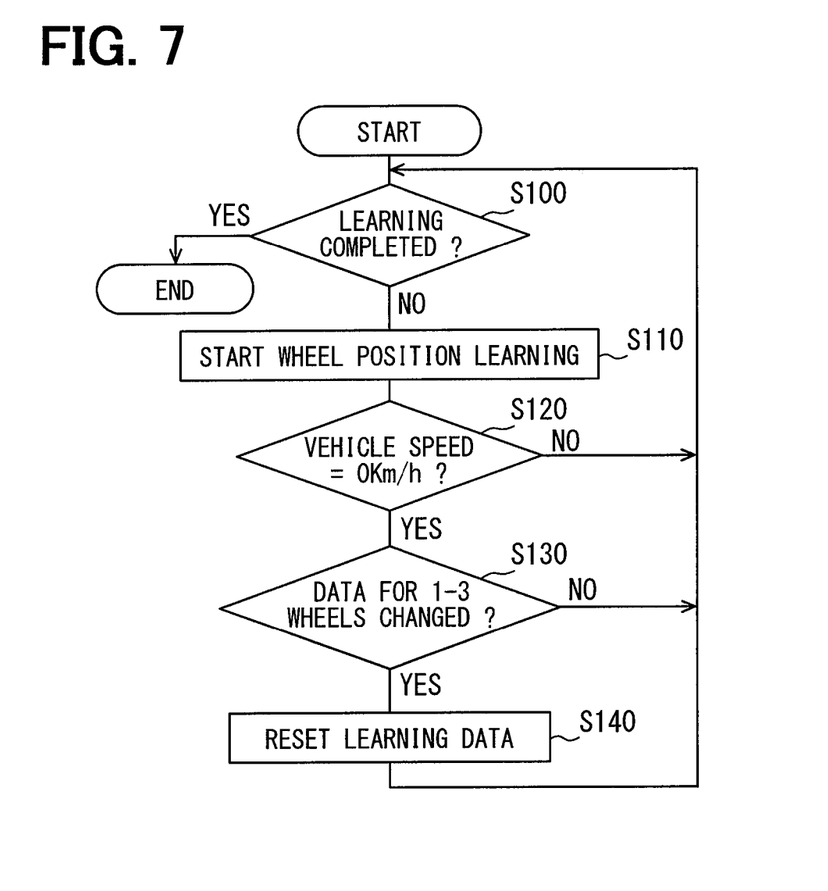
FIG. 7 is a flowchart illustrating a wheel position detection processing executed by a microcomputer.

Specifically, the wheel position detection is performed while performing the above described processing by executing a wheel position detection processing shown in a flowchart of FIG. 7. Note that the wheel position detection processing is executed by the microcomputer 33 of the TPMS-ECU 3 in every predetermined control cycle when the IG is turned on.

Firstly, at S100, it is determined whether the learning of the wheel position detection is completed or not. For example, as described with reference to FIGS. 6A to 6D, it is determined that the learning of the wheel position detection is completed when the register of identification of the transmitter 2 transmitting the frame to the wheel has been completed for all the transmitters transmitting the frames containing ID1 to ID4. On the other hand, it is determined that the learning is not completed when the register of identification of any of the transmitters 2 to the wheels has not been made.

When the determination result of S100 is negative, the processing proceeds to S110. At S110, the learning of the wheel position detection is performed in the way as described above. As shown in FIGS. 6A to 6D, the edge number (or the tooth number) of each wheel is registered each time the frame including ID1-ID4 is received, and the candidate wheels are specified.

Next, at S120, it is determined whether the vehicle sped is zero km/h or not, that is, whether the vehicle is in a stopped state or not. Specifically, the TPMS-ECU 3 acquires the vehicle speed information from the brake ECU 10, and determines whether the vehicle speed indicated by the vehicle speed information is zero km/h or not. When the determination result at S120 is negative, S100 and S110 are repeated so as to perform learning of the wheel position detection as normal. When the determination result at S120 is positive, the processing proceeds to S130 because there is a possibility that a passenger gets on or off the vehicle or loads or unloads luggage onto or from the vehicle.

At S130, it is determined whether a change in data of the edge number (or the tooth number) based on the detection signal of the wheel speed sensor 11a-11d is shown in for one wheel, two wheels or three wheels. In this case, if there is no change in data of the edge number (or the tooth number) is found in any wheels, or if the change in data of the edge number (or the tooth number) is found for all four wheels, the determination result at S130 is negative and S100 to S120 are repeated. When the determination result at S130 is positive, the processing proceeds to S140 and the learning data of the wheel position detection is reset.

For example, the learning data, which have obtained so far, as shown in FIGS. 6A to 6D, are all reset, and the learning of the wheel position detection is performed again from the beginning. In this way, since the wheel position detection can be performed again from the beginning, it is less likely that the wheel position will be erroneously detected based on an erroneous learning data.

Alternatively, among the learning data shown in FIGS. 6A to 6D learned so far, the data in which the wheel position has not been specified is reset. For example, when three times of frame reception have been done from each transmitter 2, since the specifying of the wheel position has completed in the learning data of ID3 and ID4 shown in FIGS. 6C and 6D, the learning data of ID3 and ID4 remain to be used, and only the learning data of ID1 and ID2 shown in FIGS. 6A and 6B are reset. Also in this case, the learning data in error is reset. Therefore, it is less likely that the wheel position is erroneously detected based on the erroneous learning data. In this case, the wheel position detection is not performed again from the beginning by resetting all the learning data. That is, the specifying of the wheel position is newly performed only for the wheel whose position has not been specified. Therefore, the time necessary for the wheel position detection after the resetting can be reduced.

As further another example, among the learning data that have learned so far as shown in FIGS. 6A to 6D, the learning data remaining as the wheel candidates is reset, and the learning data that has been excluded from the candidate wheel is not reset. For example, in a case where two times of frame reception from each transmitter 2 have been done, the front right wheel FR and the rear right wheel RR have been excluded from the candidate wheels in the learning data ID1 shown in FIG. 6A, and these learning data is kept to be used. However, the learning data of the front left wheel FL and the rear left wheel RL are reset. In this case, only the learning data less reliable is reset while utilizing the learning data which have learned so far as much as possible. Therefore, the time necessary for the wheel position detection after the resetting can be further shortened.

As described above, in the present embodiment, in the case where the edge number (or the tooth number) is incremented based on the detection signal of the wheel speed sensor 11a-11d of one to three wheels while the vehicle in the stopped state, the learning data whose edge number (or the tooth number) is incremented is not used as the learning data. Accordingly, it is less likely that the wheel position will be erroneously detected based on the erroneous learning data. As such, the wheel position detecting device and the tire air pressure detecting apparatus having the wheel position detecting device can suppress erroneous detection of the wheel position, even if the moving direction of the vehicle cannot be identified whether the frontward direction or the rearward direction.

There is a possibility that the tires will move at a moment that the vehicle stops or when noise will superimpose on the detection signals of the wheel speed sensors 11a-11d. In these cases, however, the change in data of the edge number (or the tooth number) does not last. Therefore, the processing may proceed to S140, when the determination results of S120 and S130 are positive for several times, to reset the learning data so as to filter the noise of the wheel speed sensors 11a-11d or to ensure robustness.

Other Embodiments

While only the selected exemplary embodiments have been chosen to illustrate the present disclosure, it will be apparent to those skilled in the art from this disclosure that various changes and modifications can be made therein without departing from the scope of the disclosure as defined in the appended claims. Furthermore, the foregoing description of the exemplary embodiments according to the present disclosure is provided for illustration only, and not for the purpose of limiting the disclosure as defined by the appended claims and their equivalents.

In the embodiments described above, the zero degree position to transmit the frame from the transmitter 2 is defined at a position where the acceleration sensor 22 is right above the center axis of the corresponding wheel 5a-5d. This is an example, and the zero degree position is set to any position in a circumferential direction of the wheel.

In the embodiments described above, the variation allowance range is changed each time the frame is received such that the variation allowance range is gradually reduced. However, the variation allowance range that is set centering on the tooth position is fixed. The variation allowance range that is set centering on the tooth position may be also changed. For example, the variation of the tooth position is likely to increase with an increase in vehicle speed. Therefore, in a case where the variation allowance range is increased with the increase in vehicle speed, the variation allowance range may be further accurately set. Also, accuracy of detecting the timing where the angular position of the acceleration sensor is at the predetermined angular position is likely to reduce with an increase in sampling interval of detecting the acceleration by the acceleration sensor 22. Therefore, the variation allowance range may be changed in accordance with the sampling interval. In such a case, the variation allowance range is further accurately set. Since the transmitter 2 realizes the sampling interval and the like, the transmitter 2 may include data for determining the magnitude of the variation allowance range in the frame.

In the embodiments described above, the TPMS-ECU 3 acquires the gear information from the brake ECU 10. However, the TPMS-ECU 3 may acquire the edge number or the tooth number as the gear information in any other way. For example, the TPMS-ECU 3 may acquire the edge number or the tooth number as the gear information from another ECU. As another example, the TPMS-ECU 30 may receive the detection signals from the wheel speed sensors 11a-11d, and obtain the edge number or the tooth number of each gear 12a-12d based on the detection signal obtained. In the embodiments described above, the TPMS-ECU 3 and the brake ECU 10 are separate ECUs. As another example, the TPMS-ECU 3 and the brake ECU 10 may be integrated into a single ECU. That is, the TPMS-ECU 3 and the brake ECU 10 may be provided by a single ECU. In such a case, the ECU may directly receive the detection signals of the wheel speed sensors 11a-11d, and obtain the edge number or the tooth number of each gear 12a-12d based on the detection signal received. In this case, the ECU can always obtain the edge numbers or the tooth numbers. Therefore, the wheel position detection is performed based on the gear information at an exact reception timing of the frame, differently from the case where the gear information is received at the predetermined interval.

In the embodiments described above, the wheel position detection device is exemplarily employed to the vehicle 1 having four wheels 5a-5d. The wheel position detection device may be employed to a vehicle having wheels more than four.

In the present disclosure, the wheel speed sensors 11a-11d detect at least the passage of the teeth of the gears 12a-12d rotated in association with the wheels 5a-5d. The gears 12a-12d may have a structure in which teeth have conductive outer surfaces and intermediate portions between the teeth have a magnetic resistance different from the outer surfaces of the teeth. Namely, the gears 12a-12d may have any structure. That is, the gears 12a-12d may be a general gear having projections and recesses on an outer surface of the gear. The projections have conductivity, and the recesses are spaces providing non-conductive portions. As another example, the gears 12a-12d may be a rotor switch whose outer surface includes conductive portions and non-conductive insulation portions, as described in JP-A-10-048233.

In FIG. 7, the section executing S110 corresponds to a wheel position learning section, and the section executing S130 corresponds to a change detecting section. The section executing S140 corresponds to a resetting section.

It is noted that a flowchart or the processing of the flowchart in the present disclosure includes sections (also referred to as steps), each of which is represented, for instance, as S100. Further, each section can be divided into several sub-sections while several sections can be combined into a single section. Furthermore, each of thus configured sections can be also referred to as a circuit, device, module, or means.

What is claimed is:

1. A wheel position detecting device for a vehicle having a vehicle body and a plurality of wheels with tires, the wheel position detecting device comprising:
   a transmitter being integrated to each of the plurality of wheels, the transmitter including a first control unit, the first control unit generating and transmitting a frame including identification information specific to the transmitter; and a receiver being integrated to the vehicle body, the receiver including an antenna and a second control unit, the second control unit receiving the frame transmitted from the transmitter through the antenna, the second control unit performing a wheel position detection to specify which of the plurality of wheels the transmitter transmitting the frame is integrated to and to store a relationship between the identification information of the transmitter and the wheel to which the transmitter is integrated, wherein the transmitter includes an acceleration sensor that outputs a detection signal according to an acceleration containing a gravitational acceleration component varying with rotation of the wheel to which the transmitter is integrated, the first control unit detects an angle of the transmitter relative to a zero degree position based on the gravitational acceleration component provided by the detection signal of the acceleration sensor, the zero degree position being set at any position in a circumferential direction of the wheel to which the transmitter is integrated with respect to a center axis of the wheel as a center, the first control unit repeatedly transmits the frame when the angle of the transmitter is a predetermined transmission angle, the second control unit acquires an edge number or a tooth number of each of a plurality of gears based on a plurality of wheel speed sensors that detect passages of teeth of the gears, the gears being provided to rotate in association with the wheels, each of the gears including the teeth having conductivity and intermediate portions between the teeth, the teeth and the intermediate portions being alternately arranged so that the gear has outer surfaces having different magnetic resistances, and the second control unit includes:
- a wheel position learning section that, when receiving the frame, repeatedly acquires the edge numbers or the tooth numbers at a reception timing of the frame, stores, as learning data, the edge numbers or the tooth numbers of the respective wheels at the reception timing of the frame for every identification information, and performs a wheel position detection based on the learning data stored,
- a change detecting section that detects a change in the edge number or the tooth number of only a part of the wheels when the vehicle is at halt; and
- a resetting section that resets the learning data when the change in the edge number or the tooth number is detected by the change detecting section.

2. The wheel position detecting device according to claim 1, wherein in the second control unit, when the change in the edge number or the tooth number is detected by the change detecting section, the resetting section resets all the learning data, and the wheel position learning section stores the learning data again and performs the wheel position detection.

3. The wheel position detecting device according to claim 1, wherein the second control unit sets a variation allowance range based on the learning data, and, when the edge number or the tooth number at a subsequent reception timing of the frame after the setting of the variation allowance range is not within the variation allowance range, excludes the wheel corresponding to the gear the edge number or the tooth number of which is not within the variation allowance range from a candidate wheel so as to specify the wheel to which the transmitter transmitting the frame is integrated, and when the change in the edge number or the tooth number is detected by the change detecting section, the resetting section resets the learning data of only the frame in which the wheel to which the transmitter transmitting the frame is not specified, and the wheel position learning section stores the learning data again and performs the wheel position detection.

4. The wheel position detecting device according to claim 1, wherein the second control unit sets a variation allowance range based on the learning data, and, when the edge number or the tooth number at a subsequent reception timing of the frame after the setting of the variation allowance range is not within the variation allowance range, excludes the wheel corresponding to the gear the edge number or the tooth number of which is not within the variation allowance range from a candidate wheel so as to specify the wheel to which the transmitter transmitting the frame is integrated, and when the change in the edge number or the tooth number is detected by the change detecting section, the resetting section resets the learning data of the wheel that is not excluded from the candidate wheel in the frame in which the wheel to which the transmitter transmitting the frame has not been specified, and the wheel position learning section stores the learning data again of the wheel remaining as the candidate wheel and performs the wheel position detection.

5. A tire air pressure detecting apparatus comprising:

the wheel position detecting device according to claim 1, wherein the transmitter includes a sensing unit that outputs a detection signal according to an air pressure of the tire of the corresponding wheel, the first control unit of the transmitter generates tire air pressure information by processing the detection signal of the sensing unit, stores the tire air pressure information in the frame, and transmits the frame, and the second control unit of the receiver detects the air pressure of the tire of each of the wheels based on the tire air pressure information stored in the frame.

* * * * *